G. A. LEONARD.
BLOCK MOLDING MACHINE.
APPLICATION FILED MAR. 14, 1914.
1,143,769.
Patented June 22, 1915.
2 SHEETS—SHEET 1.
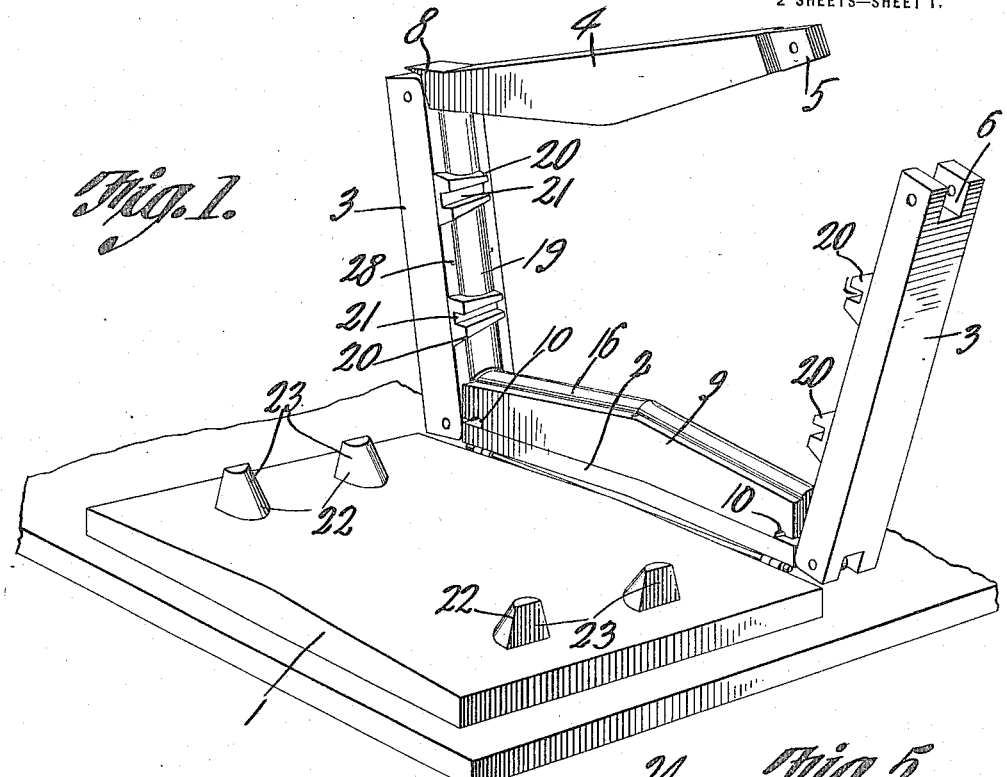
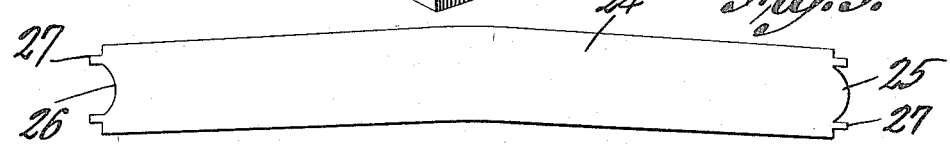
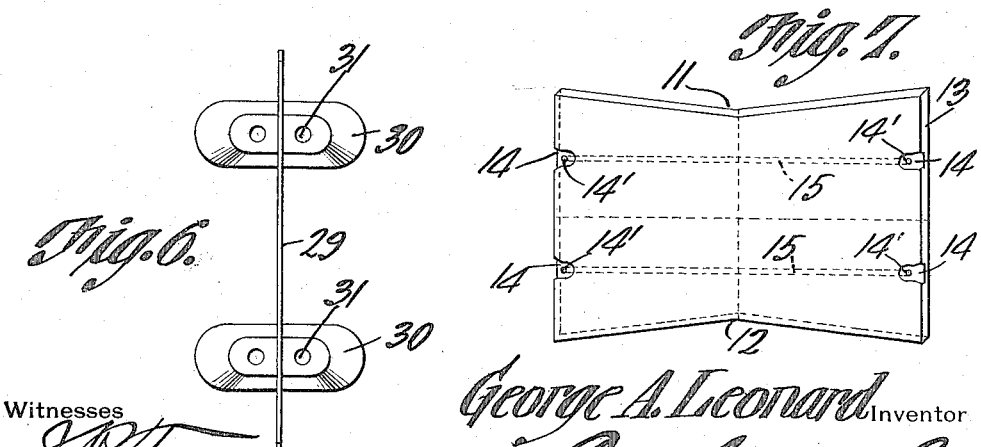
Witnesses
George A. Leonard, Inventor
by C. A. Snow & Co.
Attorneys

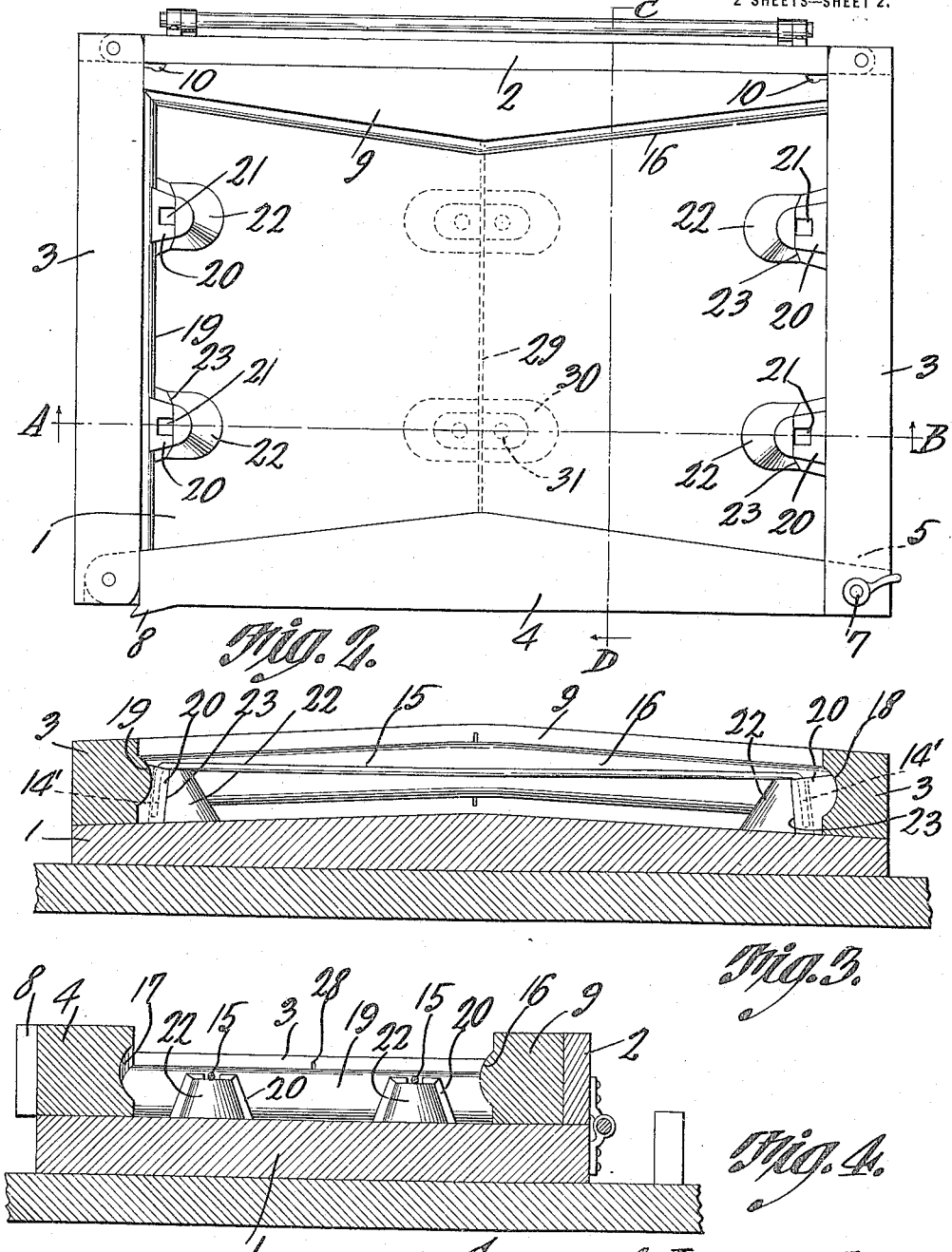

UNITED STATES PATENT OFFICE.

GEORGE A. LEONARD, OF SHEFFIELD, IOWA.

BLOCK-MOLDING MACHINE.

1,143,769.  Specification of Letters Patent.  Patented June 22, 1915.

Application filed March 14, 1914. Serial No. 824,768.

*To all whom it may concern:*

Be it known that I, GEORGE A. LEONARD, a citizen of the United States, residing at Sheffield, in the county of Franklin and State of Iowa, have invented a new and useful Block-Molding Machine, of which the following is a specification.

This invention relates to machines particularly designed for molding building blocks of that type utilizing tie rods having laterally projecting exposed terminals seated within recesses in the blocks.

One of the objects of the invention is to provide a machine of this type in which the pallet is removably mounted between the side members of the mold, the said side members and the top member of the mold being hingedly mounted so as to swing outwardly away from the molded object and thus permit the ready withdrawal from said object of those portions of the cores carried by the mold members.

A further object is to provide split cores for producing recesses in the molded objects, said cores constituting supports for the tie rods to be embedded in the molded objects and also forming sockets for the reception of the offset terminals of the rods.

Another object is to provide a mold which, when opened out, will withdraw from the various faces of the molded object without mutilating or otherwise injuring the object.

Another object is to provide a mold which, by the use of supplemental partition strips, can be employed for producing long or short halves of a complete block.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

In the accompanying drawings, the preferred form of the invention has been shown.

In said drawings:—Figure 1 is a perspective view of a mold embodying the present improvements, the side and top members thereof being shown opened out and elevated above the bed plate. Fig. 2 is a plan view of the mold showing the parts assembled, the position of a division strip being indicated by dotted lines. Fig. 3 is a section on line A—B, Fig. 2, a tie rod being shown seated on the core and in position to be embedded by the plastic material supplied to the mold. Fig. 4 is a section on line C—D Fig. 2. Fig. 5 is a detail view of one form of division strip which may be used in connection with the mold. Fig. 6 is a detail view of another form of division strip which may be used in connection with the mold. Fig. 7 is an elevation of a block such as can be produced by means of a mold such as covered by this application.

Referring to the figures by characters of reference, 1 designates a bed plate the upper or active face of which can be of any preferred contour, this being dependent upon the form of block to be produced. In the structure shown the upper surface of the bed plate is inclined downwardly from the center to the ends thereof.

Hingedly connected to the bed plate 1 at one side thereof is the bottom member 2 of the mold and hingedly connected to each end of the bottom member is a side member 3. A top member 4 is hingedly connected to the upper or outer end of one of the side members 3 and may be provided at its free end with a tongue 5 adapted, when the mold is set up for use, to be seated within a recess 6 formed in the outer or free end of the opposed member 3. When tongue 5 is seated in the recess 6, it can be secured in place in any preferred manner, as by means of a bolt 7 inserted transversely through the tongue and through the walls of the recess 6. If preferred, and as shown in the drawings, an angular extension 8 may be formed on or secured to the top member 4 near its hinged end so that, after said top member has been swung upwardly a predetermined distance relative to the side member 3 to which it is secured, the extension 8 will come against said side member 3. Consequently, further upward movement of the top member 4 will result in lateral swinging of the member 3 to which it is connected. With this arrangement, the danger of shifting the member 3 laterally before the top member 4 has been completely withdrawn from the molded object, is practically avoided and, consequently, a better product can be obtained.

A pallet 9 is adapted to be fitted loosely upon the bottom member 2 and between the side members 3 and this pallet has its lower corners cut away to form recesses 10 designed to receive tongs or other devices, not shown, whereby the pallet and the molded object supported thereby, can be lifted readily from the machine and conveyed from place to place.

The contours of the inner or active faces of the members 3 and 4 and of the pallet 9 are of course dependent upon the object to be produced. The present device is especially designed to produce a plastic block such as shown in Fig. 7, said block being formed with upper edges converging inwardly to a central point as shown at 11, with lower edges similarly disposed, as shown at 12, with a bead 13 formed along the upper edges and one end, and a corresponding groove formed within the lower edges and the other end. Recesses 14 are formed in one face of the block at the ends thereof and extending into these recesses are the laterally projected terminals 14' of tie rods 15, which tie rods are embedded within the block.

In order to produce a block such as described, it is necessary that the inner or active faces of the pallet 9 converge as shown, these converging faces being formed with longitudinal beads 16 extending throughout the length thereof. The top member 4 has its inner or active faces converging inwardly and provided with longitudinal grooves 17 of the same proportions as the beads 16. A longitudinal groove 18 is formed in one side member 3 and is of the same proportions as the grooves 17 while a longitudinal bead 19 of the same proportions as the beads 16 is formed along the inner side of the other side member 3. Both the groove 18 and the bead 19 are intersected by inwardly extending core members 20 each of which is tapered toward the upper or outer side of the mold and has a longitudinal groove 21 in its inner face. These core members do not extend throughout the thickness of the side members 3 but merely from the lower or inner faces of said side members to points slightly beyond the centers of the inner faces of the side members, as shown particularly in Figs. 3 and 4.

Upstanding from the bed plate 1 are stationary core members 22 having flat inclined outer faces 23 adapted to be engaged by the grooved faces of the core members 20 when the side members 3 of the mold are resting on the bed plate 1 as shown in Fig. 3. These stationary core members 22 are preferably tapered toward their free ends and it is to be understood that they can be of any desired cross sectional contour. In using the machine herein described, the pallet 9 is positioned on the bottom member 2 of the mold and the side and top members of the mold are brought together and fastened by means of the bolt 7. The said members are then swung downwardly onto the bed plate 1, thus bringing the core members 20 in contact with the stationary core members 22, as shown in Figs. 2 and 3. Consequently, the grooves 21 will form sockets. The tie rods 15 to be embedded within the plastic block and which have offset ends 14, are placed on the core members 22 with said offset ends projecting downwardly into the grooves 21. The cement or other material of which the block is to be formed is then tamped within the mold and after it has been troweled the members 2, 3 and 4 of the mold are swung upwardly together away from the bed plate 1, thus withdrawing the molded block from the stationary core members 22. The top member 4 is then disconnected from the opposed side member 3 and swung upwardly, this action resulting in the upward withdrawal of said top member from engagement with the top face of the molded block. As soon as this top member becomes disengaged from the block, the projection 8 will come into contact with the upper end of the member 3 to which the top member 4 is hinged and further upward movement of the top member 4 will result in the said member 3 being shifted laterally away from the block, thus withdrawing the outer core section 20 from one end of the block. The other member 3 can then be swung laterally away from the block so as to withdraw the remaining outer core members 20 from said block. Tongs or other suitable carrying devices can then be slipped into the recesses 10 under the ends of the pallet 9 and said pallet together with the molded block, conveyed easily to a point where it can be left to dry.

Should it be desired to form the block in long halves, a division plate 24 can be inserted between the side members 3. This division plate has a rounded projection 25 at one end designed to fit snugly within the groove 18 and has a recess 26 in its other end adapted to receive the bead 19. Small fingers 27 extend from each end of the division plate and are adapted to project into minute recesses 28 formed in the members 3. The lower edge of the division plate is of course so shaped as to fit snugly upon the bed plate 1.

Should it be desired to form short halves of the block, a division strip such as shown in Fig. 6 can be used. This division member includes a thin metal strip 29 having a recess in one end and an extension at its other end corresponding with the recess and extension at the ends of the strip 24 and also provided with fingers corresponding with the fingers 27 and adapted to be seated in recesses in the pallet 9 and top member 4. Secured to each side of the strip 29 are lugs 30, each of which is of substantially the same contour and size as a pair of members 20 and